US010815160B2

(12) United States Patent
Riaza Martinez et al.

(10) Patent No.: US 10,815,160 B2
(45) Date of Patent: Oct. 27, 2020

(54) ANTICAKING COMPOSITIONS FOR SOLID FERTILIZERS, COMPRISING QUATERNARY ESTER AMMONIUM COMPOUNDS

(71) Applicant: KAO Corporation S.A., Barbera del Valles (ES)

(72) Inventors: Joan A. Riaza Martinez, Barbera del Valles (ES); Miquel Mundo Blanch, Barbera del Valles (ES)

(73) Assignee: KAO Corporation S.A., Barbera del Valles (ES)

( * ) Notice: Subject to any disclaimer, the term of this patent is extended or adjusted under 35 U.S.C. 154(b) by 377 days.

(21) Appl. No.: 15/746,046

(22) PCT Filed: Jul. 7, 2016

(86) PCT No.: PCT/EP2016/066115
§ 371 (c)(1),
(2) Date: Jan. 19, 2018

(87) PCT Pub. No.: WO2017/012884
PCT Pub. Date: Jan. 26, 2017

(65) Prior Publication Data
US 2018/0208516 A1 Jul. 26, 2018

(30) Foreign Application Priority Data

Jul. 22, 2015 (EP) .................... 15382380

(51) Int. Cl.
*C05G 3/20* (2020.01)
*B01J 2/30* (2006.01)
*C05G 5/30* (2020.01)

(52) U.S. Cl.
CPC ............... *C05G 3/20* (2020.02); *B01J 2/30* (2013.01); *C05G 5/30* (2020.02); *C05G 5/37* (2020.02); *C05G 5/38* (2020.02)

(58) Field of Classification Search
None
See application file for complete search history.

(56) References Cited

U.S. PATENT DOCUMENTS

| 3,388,990 A | * | 6/1968 | Iwao | ....................... C05C 3/005 71/64.07 |
| 5,364,440 A | * | 11/1994 | Schapira | .................. C05G 3/20 71/64.12 |
| 5,472,476 A | * | 12/1995 | Schapira | .................. C05G 3/20 71/64.12 |

FOREIGN PATENT DOCUMENTS

| EP | 0711739 A1 | 5/1996 | |
| EP | 2497844 A1 | 9/2012 | |
| EP | 2899178 B1 | 7/2015 | |
| RU | 2036189 C1 | 5/1995 | |
| RU | 2148054 C1 | 4/2000 | |
| WO | WO 02/100799 | * 12/2002 | .............. C05G 3/00 |

OTHER PUBLICATIONS

Federal Institute of Industrial Property Search Report dated Aug. 31, 2018.
International Search Report and Written Opinion dated Aug. 10, 2016.

* cited by examiner

*Primary Examiner* — Wayne A Langel
(74) *Attorney, Agent, or Firm* — Timothy J. Monahan; Monahan & Company, LLC

(57) ABSTRACT

Anticaking compositions for solid fertilizers comprising quaternary ester ammonium compounds, the use thereof, methods of preparing solid fertilizers resistant to caking and solid fertilizers obtained thereby.

20 Claims, No Drawings

ANTICAKING COMPOSITIONS FOR SOLID FERTILIZERS, COMPRISING QUATERNARY ESTER AMMONIUM COMPOUNDS

FIELD OF THE INVENTION

The present invention relates to compositions comprising a mixture of quaternary ester ammonium compounds and a solvent for preventing caking and crust formation in several types of solid fertilizers.

STATE OF THE ART

Fertilizers are organic or inorganic materials of natural or synthetic origin (other than liming materials) that, when added to a soil, enrich that soil in substances which constitute essential nutrients to the growth of plants.

Fertilizers can be liquid or solid, being alternatively used depending on the purpose. Liquid fertilizers provide fast and direct nourishment for the plants, while solid fertilizers nourish the soil micro organisms, acting therefore as slow releasers of the nutrients. Among solid fertilizers, two of the most generally used types are granular simple fertilizers and granular complex fertilizers:

Granular simple fertilizers include primary macronutrients, potassium, phosphorous or nitrogen compounds assimilable by plants. Some examples are potassium chloride (KCl), ammonium nitrate (AN), and calcium nitrate (CN), mono- and diammonium phosphates and urea-based fertilizers.

Granular complex fertilizers include combinations of more than one primary macronutrient. They are usually called NPK and can be differentiated from one another mainly because of their nitrogen, phosphorous and potassium content, expressed as the percentage of nitrogen (N), phosphoric anhydride ($P_2O_5$) and potassium oxide ($K_2O$) that the complex fertilizer contains.

Both types of fertilizers, and generally solid fertilizers, have as a main application problem that rather frequently, unless treated to avoid it, they experiment caking phenomenon during storage. The recently manufactured solid fertilizer shows good flowability and homogeneity, but the salts therein contained may cause the agglomeration of particles during storage and handling in bulk. Such agglomeration is very much dependant on the temperature, humidity and pressure conditions. If not avoided, the agglomeration of the fertilizer results into the formation of large, agglomerated fertilizer lumps. The bigger the lumps, the more difficult to mix the fertilizer with the soil, causing the loss of the fertilizer efficiency. The agglomeration may further cause the formation of a crust on the surface of the fertilizer. Thus, the caking and crust formation of fertilizers is a major drawback when dosing and applying them, and it also has an impact in economic losses.

Another problem observed during the handling of granular fertilizers (also known as particulate fertilizers) is dust formation during the manufacture, the storage and the transport of the fertilizer particles. Dust formation is mainly caused by the mechanical abrasion resulting from the movements of the fertilizer particles. Other processes that contribute to dust formation are the existence of certain continuous chemical reactions that result in the particle disintegration and the occurrence of a curing process after the initial formation of the particle. Besides, environmental temperature and humidity are factors that further determine the degree of dust formation.

Dust formation can be really a major problem. The dust formed during the handling of the fertilizer particles can remain suspended in the air for a substantially long period of time. The presence of dust in the air can lead to safety, health, environmental and economic problems.

One of the most common solutions used to reduce both the caking problem and the dust formation problem is the addition to the fertilizer of an anticaking and antidusting additive. Said additive can be applied to the fertilizer just recently manufactured or after a curing period in the warehouse. The fertilizer is treated with a fluid composition comprising the active anticaking compound in order a protective coating comprising said additive is formed over the fertiliser particles' or granules' surface; the coating quickly solidifies or acquires sufficient viscosity in contact with the solid fertilizer, and provides protection from the caking and dusting disadvantages.

Also in the field of fertilizers industry as in any other industry nowadays, there exists an increasing demand of more environmentally friendly and more easily biodegradable products, and this applies also for fertilizer anticaking additives. In this regard, the use of surface active agents with reduced eco-toxicity and lower bioaccumulation potential to prevent environmental issues is of particular interest. Such a trend is reflected also by the changes in the regulations affecting this field. For instance, legislation in Europe is being more severe in the use of fertilizer anticaking additives with low ecological profile in order to ensure that they do not become an environmental risk.

Therefore there is a need for additives that meet environmental standards and that give good results in caking prevention for solid fertilizer particles.

One of the solutions for environmentally friendly anticaking products described in the prior art is to convert certain waste materials in valuable products, such as coatings for fertilizers. WO2006091076 describes the use of residual flows of natural origin, preferably vegetable waste flows, such as corn and wheat residues, as additive for fertilizers, in order to reduce the caking tendency, the moisture absorption of the granules, the dust formation and/or the compressibility.

Another approach is the use of biodegradable polymers as a coating for fertilizers. For instance, WO2009151316 describes a coating composition for a fertilizer comprising a polymer compound derived from the bottom fraction of the biodiesel distillation process, wherein said polymer is based on unsaturated monomers containing fatty alkyl groups.

EP1390322 describes a different solution which consists in using as anticaking additive a coating composition which comprises wax, oil (being vegetable, animal or marine oil), a surfactant, preferably being a sulphonate, phosphate ester, glutinate, sulphate, ethoxylated amide, and optionally comprising a resin and a biodegradable polymer. Preferably the composition contains NP—(nitrogen-phosphorous), NK—(nitrogen-potassium), NPK—(nitrogen-phosphorous-potassium), AN (ammonium nitrate) or nitrogen fertilizers with sulphur, urea or CAN (calcium ammonium nitrate), and 0.05-1.5% by weight of the coating composition.

Caking can also be prevented by the use of biomass compositions. For instance, WO2009074679 describes the use of biomass solid particles and a dispersant, being an oil, fat or wax, as a coating composition for fertilizers. It describes a good flowability of the fertilizer and a readily absorption into the environment of the residual coating.

EP0711739 describes a mixture (containing synthetic or natural oil and an alkanolamine fatty acid ester) for manufacturing dust free and non caking fertilizers. The mixture shows good biodegradability.

Finally, another approach to cake and dust prevention is disclosed in WO2009004024, wherein a composition (comprising a phosphoric ester and a fatty trialkylamine) for preventing the caking of fertilizers in the form of granular solids is described. These anticaking compositions show a low melting point, thus they require the application of less energy when applied to the fertilizer, and this results in an easier application of the coating and a environmental improvement because of the energy saving.

From the state of the art set forth above, it can be seen that prevention of caking of solid fertilizers is a complex problem and is far from being considered completely solved. It can also be seen that already several approaches with ecofriendly products have been described. However, there is a need for anticaking compositions suitable for products such as fertilizers. This anticaking compositions shall, at the same time, have low enough price and solve the different technical problems related to its application: good performance as anticaking and antidusting, stability and suitable rheologic behaviour with temperature.

SUMMARY OF THE INVENTION

The first object of the present invention is a composition comprising a component (a), which comprises a mixture of at least one or more quaternary mono-, di- or tri-ester ammonium compounds of formula (I1), (I2), (I3) and a component (b), which comprises a solvent.

A further object is a composition for preventing the caking of solid fertilizers, said composition comprising a component (a), which comprises a mixture of at least one or more quaternary mono-, di- or tri-ester ammonium compounds of formula (I1), (I2), (I3), and a component (b), which comprises a solvent.

Another object of the present invention is a solid fertilizer resistant to caking, characterized in that solids are coated by a composition according to the present invention.

The use of a composition according to the invention for preventing the caking of solid fertilizers is also part of the invention.

Another object of the present invention is a method for obtaining a protected solid fertilizers, based on the application of a composition according to the invention on the surface of the solid fertilizer.

DETAILED DESCRIPTION OF THE INVENTION

The main object of the present invention is a composition comprising a component (a), which comprises a mixture of at least one or more quaternary mono-, di- or tri-ester ammonium compounds of formula (I1), (I2), (I3), wherein the sum weight of di- and tri-ester ammonium compound (I2) and (I3)) is from 70 to 100% wt, based on the total weight of quaternized species comprised in component (a), preferably 80 to 100% wt and more preferably 85 to 100% wt; and a component (b), which comprises a solvent, wherein the solvent is selected from mineral oils, paraffins and waxes derived from petroleum and vegetal and animal fats and oils.

According to a preferred embodiment, the above composition is a composition for preventing the caking of solid fertilizers.

(a): Component a:

The present invention comprises a component (a), that comprises a mixture of at least one or more quaternary mono-, di- or tri-ester ammonium compound (commonly known as mono-esterquat (mono-EQ), di-esterquat(di-EQ), tri-esterquat (tri-EQ)) of formula (I1), (I2), (I3):

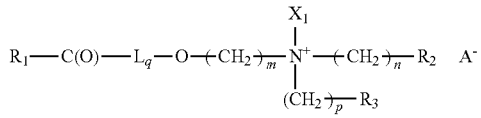

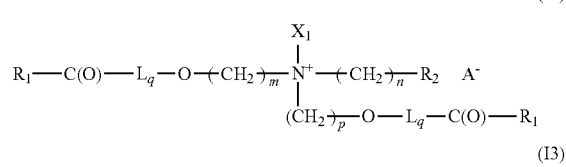

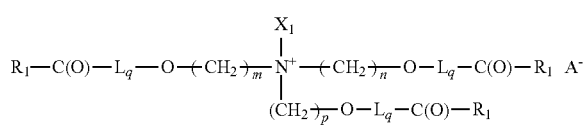

wherein in formulae I1, I2 and I3

$R_2$ and $R_3$ each independently represent —H or —OH, $X_1$ represents a hydroxyalkyl group containing 1 to 4 carbon atoms, an alkyl group containing 1 to 4 carbon atoms or an alkyl group containing one aromatic group;

$R_1$ is a linear or branched alkyl containing 5 to 23 carbon atoms or a linear alkenyl group containing 5 to 23 carbon atoms and from 1 to 3 double bonds. In formulae I1, I2 and I3 each $R_1$ can independently represent the same or different linear or branched alkyl chain;

$A^-$ represents an anion;

L represents a —$(OCH_2CH_2)_a$—$(OCHR_4CH_2)_b$— group, wherein $R_4$ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26;

m, n, p each independently represent a number within the range from 1 to 4, q represents a number with the range from 0 to 26; wherein in said component (a) the sum weight percentage of di- and tri-quaternary ester ammonium compound ((I2) and (I3)) is from 70 to 100% wt based on the total weight of quaternized species comprised in component (a), preferably from 80 to 100% wt and more preferably from 85 to 100% wt.

The sum weight percentage of di-EQ and tri-EQ is calculated with respect to the total weight of quaternized species comprised in component (a). Quaternized species of component (a) are quaternary mono-, di-, tri-ester ammonium compound as well as quaternized alkanolamine The quaternary ester ammonium compounds of the invention can be ethoxylated and/or propoxylated, since a and b can be larger than 0. The order of sequence of the ethylene oxide and propylene oxide groups is not critical for the invention.

In the case q is 2 or larger, each L group may be the same or different. Also the (L)q groups contained in the different branches within the compounds of formula (I1), (I2), (I3) may independently represent different meanings.

The sum of a+b preferably represents the average alcoxilation degree which corresponds to a number from 0 to 10, more preferably from 0 to 6, most preferred is 0.

Preferably, $X_1$; is an alkyl group; more preferably $X_2$ is a methyl group.

Preferably, $A^-$ is selected from a halide, phosphate or alkylsulphate.

Within the present patent application, when a numerical range is indicated, all the individual numbers included in said range are intended to be included. For example, a range from 0 to 10 will include all the individual numbers 0,1,2, 3,4,5,6,7,8,9 and 10. The same shall apply to any other range indicated.

The sum weight percentage of quaternary di-ester ammonium compound (di-EQ) represented by formula (I2) and quaternary tri-ester ammonium compound (tri-EQ) represented by formula (I3) is from 70 to 100% wt, preferably from 80 to 100% wt and more preferably from 85 to 100% wt, based on the total weight of quaternized species comprised in component (a) as defined above.

In the case the weight percentage of tri-EQ is 0, the sum weight percentage of di-EQ and tri-EQ corresponds to the weight percentage of di-EQ compound.

The sum weight percentage of quaternary ester ammonium compounds of formula (I2) and (I3) can be determined according to standard NMR methods known by the skilled in the art.

In a particularly preferred embodiment, component (a) comprises a mixture of at least one quaternary mono-ester ammonium compound of formula (I1), at least one quaternary di-ester ammonium compound formula (I2), and at least one quaternary tri-ester ammonium compound of formula (I3), wherein m=n=p=2; $R_1$—C(O)— is a linear acyl group wherein $R_1$ is a linear alkyl or a linear alkenyl containing from 11 to 21 carbon atoms, preferably derived from (hydrogenated or non-hydrogenated) tallow fatty acid; $R_2$ and $R_3$ each represent —OH, q is 0 (i.e. the compound is not alkoxyated); $X_1$ is a methyl group; and $A^-$ is selected from a halide, phosphate or alkylsulphate, preferably alkylsulphate. The sum weight percentage of quaternary di-ester ammonium compound of formula (I2) and quaternary tri-ester ammonium compound of formula (I3) is from 80 to 100% wt, based on total weight of quaternized species comprised in component (a) and more preferably from 85 to 100% wt. Such a compound may be produced by esterifying tallow fatty acid and triethanolamine and subsequently methylating the esteramine obtained thereby.

In another embodiment of the present invention, component (a) comprises a mixture of at least one or more quaternary mono-, di- or tri-ester ammonium compounds represented by formula (I1), (I2), (I3) as defined above, wherein $R_2$ and $R_3$ independently represent —OH;

m, n and p each represent number 2.

The rest of variables have the meanings as indicated above for formula (I1), (I2), (I3).

In another embodiment of the present invention, component (a) comprises a mixture of at least one or more quaternary mono-, di- or tri-ester ammonium compounds represented by formula (I1), (I2), (I3) as defined above, wherein $R_2$ represents —H, $R_3$ represents —OH, m and p each represent number 2, and n represents number 1.

The rest of variables have the meanings as indicated above for formula (I1), (I2), (I3).

In another embodiment of the present invention, component (a) comprises a mixture of at least one or more quaternary mono-, di- or tri-ester ammonium compounds represented by formula (I1), (I2), (I3), wherein $R_2$ and $R_3$ represent —H, m represents number 2, and n and p each represent number 1

In another embodiment of the present invention, $R_1$ is a linear or branched alkyl containing 5 to 23 carbon atoms or a linear alkenyl group containing 5 to 23 carbon atoms and from 1 to 3 double bonds; preferably, the alkyl or alkenyl group contains from 11 to 21 carbon atoms.

As used herein, the term "alkyl" refers to a straight or branched hydrocarbon chain containing from 5 to 23 carbon atoms.

As used herein, the term "alkenyl" refers to a linear hydrocarbon chain containing from 5 to 23 carbon atoms and from one to 3 insaturations.

Examples of linear or branched alkyl or linear alkenyl groups are alkyls or alkenyls derived from oils and fats from plants and animals, such as palm, coconut, sunflower, soybean, palm olein, olive, canola, tall oil or tallow, possibly totally or partially hydrogenated and purified, or synthetic fatty acids such as palmitoleic acid, oleic acid, elaidinic acid, petroselinic acid, linoleic acid, linolenic acid, stearic acid, myristic acid, gadoleic acid, behenic acid and erucic acid or mixtures thereof. Preferably palm oil, coconut oil, tallow and hydrogenated tallow fatty acid are used, more preferably tallow and hydrogenated tallow fatty acid are used.

As used herein, the term "alkyl group containing one aromatic group" refers to the alkyl group as defined above, substituted by one aromatic group, wherein "aromatic group" refers to an aryl or heteroaryl group.

"Aryl" refers to aromatic ring systems comprising 6 to 14 carbon atoms, more particularly 6 to 10, even more particularly 6 carbon atoms. Examples of aryl groups are phenyl, naphthyl, indenyl, fenanthryl or anthracyl radical, preferably phenyl or naphthyl radical. Said aryl radical may be optionally substituted by one or more substituents such as hydroxy, mercapto, halo, alkyl, phenyl, alkoxy, haloalkyl, nitro, cyano, dialkylamino, aminoalkyl, acyl and alkoxycarbonyl, as defined herein.

"Alkoxy" refers to an alkyl group as defined above bonded to an oxygen atom (R—O—).

Examples of halogen atoms are Br, Cl, I and F.

The term "heteroaryl" means a monocyclic- or polycyclic aromatic ring comprising carbon atoms, hydrogen atoms, and one or more heteroatoms, preferably, 1 to 3 heteroatoms, independently selected from nitrogen, oxygen, and sulfur. The heterorayl group has 3 to 15 members and preferably 4 to 8 members. Illustrative examples of heteroaryl groups include, but are not limited to, pyridinyl, pyridazinyl, pyrimidyl, pyrazyl, triazinyl, pyrrolyl, pyrazolyl, imidazolyl, (1,2, 3,)- and (1,2,4)-triazolyl, pyrazinyl, pyrimidinyl, tetrazolyl, furyl, thienyl, isoxazolyl, thiazolyl, phenyl, isoxazolyl, and oxazolyl. A heteroaryl group can be unsubstituted or substituted with one or two suitable substituents such as hydroxy, mercapto, halo, alkyl, phenyl, alkoxy, haloalkyl, nitro, cyano, dialkylamino, aminoalkyl, acyl and alkoxycarbonyl, as defined herein. Preferably, a heteroaryl group is a monocyclic ring, wherein the ring comprises 2 to 5 carbon atoms and 1 to 3 heteroatoms.

In a preferred embodiment of the present invention, the component (a) comprises at least a mixture of one or more quaternary mono-, di- or tri-ester ammonium compounds of formula (I1), (I2), (I3), wherein R₂ and R₃ independently represent —OH, m, n and p each represent number 2.

In another embodiment of the present invention, the component (a) may further comprise a mixture of at least one or more mono-, di- or tri-esteramine of formula (I1), (I2), (I3):

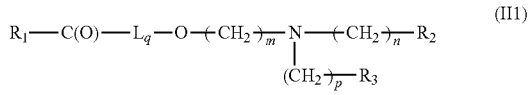
(II1)

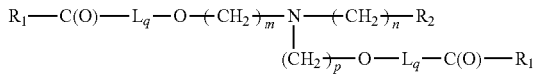
(II2)

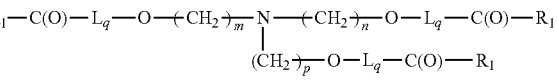
(II3)

Wherein in formula II1, II2, II3

R₁ is a linear or branched alkyl containing 5 to 23 carbon atoms or a linear alkenyl group containing 5 to 23 carbon atoms and from 1 to 3 double bonds, R₂ and R₃ each independently represent —H or —OH, L represents a —(OCH₂CH₂)ₐ—(OCHR₄CH₂)ᵦ— group, wherein R₄ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26, m, n, p each independently represent a number within the range from 1 to 4, and q represents a number with the range from 0 to 26. In the case q is 2 or larger, each L group may be the same or different. Also the (L)q groups contained in the different branches within the compounds of formula (II1), (II2), (II3) may independently represent different meanings.

The esteramine compounds of the invention can be ethoxylated and/or propoxylated, since a and b can be larger than 0. The order of sequence of the ethylene oxide and propylene oxide groups is not critical for the invention.

The sum of a+b preferably represents the average alkoxylation degree which corresponds to a number from 0 to 10, more preferably from 0 to 6, most preferred is 0.

In another embodiment of the present invention, in the mixture of at least one or more of mono-, di- or tri-esteramine of formula (II1), (II2), (II3) contained in component (a) of the composition according to the present invention, the variables therein contained have the following meanings:

R₂ and R₃ independently represent —OH, m, n and p each represent number 2.

The rest of variables have the meanings as indicated above for formulae (II1), (II2), (II3).

In another embodiment of the present invention, in the mixture of at least one or more of mono-, di- or tri-esteramine of formula (II1), (II2), (II3) contained in component (a), the variables therein contained have the following meanings:

R₂ represents —H, and R₃ represents —OH, m, p each represent number 2, and n represents number 1.

The rest of variables have the meanings as indicated above for formulae (II1), (II2), (II3).

In another embodiment of the present invention, in the mixture of at least one or more of mono-, di- or tri-esteramine of formula (II1), (II2), (II3) contained in component (a), the variables therein contained have the following meanings:

R2 and R3 represent —H, m represents number 2, and n and p each represent number 1.

In another embodiment of the present invention, R₁ is a linear or branched alkyl or a linear or branched alkenyl group containing 11 to carbon atoms, wherein in formulae II1, II2, II3, each R1 can independently represent the same or different linear or branched alkyl chain.

Examples of linear or branched alkyl or alkenyl groups are products obtained from oils and fats from plants and animals, such as palm, coconut, sunflower, soybean, palm olein, olive, canola, tall oil or tallow, possibly totally or partially hydrogenated and purified, or synthetic fatty acids such as palmitoleic acid, oleic acid, elaidinic acid, petroselinic acid, linoleic acid, linolenic acid, stearic acid, myristic acid, gadoleic acid, behenic acid and erucic acid or mixtures thereof. Preferably palm oil, coconut oil, tallow and hydrogenated tallow fatty acid are used, more preferably tallow and hydrogenated tallow fatty acid are used.

Preparation of Component (a)

The component (a) comprises a mixture of at least one or more quaternary mono-, di- or tri-ester ammonium compounds according to the invention. This mixture can be prepared by i) esterification, reacting a fatty acid (for example, but not limited to, oleic acid, palm oil, tallow, possibly totally or partially hydrogenated) with an alkanolamine (for example, but not limited to, triethanolamine, methyldiethanolamine or dimethylethanolamine) to obtain a mixture containing an esteramine, and ii) subsequently quaternising the mixture with an alkylating agent.

i) Esterification Conditions:

The reaction between the fatty acid and the alkanolamine is an esterification, and it may be conducted in a known way, as described for example in document ES-A-2021900. Preferably the esterification reaction is carried out at a temperature between 120° C. and 220° C., for a period of 2-10 hours, preferably at a reduced pressure of about 5 to 200 mbar and in the presence of one of the catalysts known for the esterification, such as hypophosphorous acid or paratoluenesulfonic acid, and also in the presence of any of the usual stabilizers and antioxidants such as tocopherols, BHT, BHA, etc.

The ratio of fatty acid to amine is from 0.60 to 1 mol of fatty acid per 1 mol of hydroxyl group of the alkanolamine, preferably from 0.80 to 1 mol of fatty acid per 1 mol of hydroxyl group of the alkanolamine.

In an embodiment of the present invention, component (a) comprises a mixture of at least one or more quaternary mono-, di- or tri-ester ammonium compounds of formula (I1), (I2), (I3), wherein m=n=p; R₁—C(O)— is a linear acyl group wherein R₁ is an alkyl or alkenyl group containing from 11 to 21 carbon atoms, preferably derived from (hydrogenated or non-hydrogenated) tallow fatty acid; R₂ and R₃ each represent —OH, q is 0 (i.e. the compound is not ethoxylated); X₁ is a methyl group; and A⁻ is selected from a halide, phosphate or alkylsulphate, preferably alkylsulphate. Such compound may be produced by esterifying tallow fatty acid and triethanolamine, wherein the ratio of tallow fatty acid to amine is 0.83 mol of tallow fatty acid per 1 mol of hydroxyl group of the triethanolamine, and subsequently methylating the esteramine obtained thereby.

In another embodiment of the present invention, component (a) comprises a mixture of at least one or more quaternary mono-, di- or tri-ester ammonium compounds of formula (I1), (I2), (I3) wherein m=p, $R_1$—C(O)— is a linear acyl group wherein $R_1$ is a linear alkyl or alkenyl containing from 11 to 21 carbon atoms, preferably derived from (hydrogenated or non-hydrogenated) tallow fatty acid; $R_2$ represents —H, $R_3$ represents —OH, q is 0 (i.e. the compound is not ethoxylated); $X_1$ is a methyl group; and $A^-$ is selected from a halide, phosphate or alkylsulphate, preferably alkylsulphate. Such compound may be produced by esterifying tallow fatty acid and methyldiethanolamine, wherein the ratio of tallow fatty acid to amine is 1 mol of tallow fatty acid per 1 mol of hydroxyl group of the methyldiethanolamine, and subsequently methylating the esteramine obtained thereby.

The product resulting from the esterification reaction comprises a mixture of mono-, di-and tri-esters of fatty acids. The product may also contain free alkanolamine and free fatty acid. The progress of the reaction may be monitored using conventional techniques, e.g. TLC or HPLC. The reaction may, for example, be monitored by consumption of the fatty acid.

ii) Quaternization:

The quaternisation of the esterification reaction product of alkanolamine with the fatty acid is conducted in a known way, as described for example in WO-A-9101295. Preferred alkylating agents include, but are not limited to, methyl chloride, dimethyl sulphate or mixtures thereof.

The quaternization may take place in bulk or in solvent, at temperatures ranging from 40° C. to 100° C. If a solvent is employed, then the starting materials and/or product must be soluble in the solvent to the extent necessary for the reaction (possible solvents can be the same solvents as used as component (b) as defined below). The quaternization can be carried at temperatures between 40° C. and 100° C. The composition that results from the quaternization process comprises quaternised ester compounds having one (monoesterquat), two (diesterquat) or three (triesterquat) ester groups. The product may also contain quaternised alkanolamine, esteramine and small amounts of the unreacted fatty acid.

In an embodiment of the present invention, the composition that results from the quaternization process further comprises a mixture of at least one or more mono-, di- or tri-esteramine compounds.

In another embodiment of the present invention, the composition that results from the quaternization process further comprises a mixture of at least one or more mono-, di- or tri-esteramine compounds, wherein the mixture of esteramine compounds is obtained from the partial quaternization of the esterification reaction product. The quaternization reaction may take place in a degree from 25% to 95% of the totality of the reaction.

In another embodiment of the present invention, the composition that results from the quaternization process further comprises a mixture of at least one or more mono-, di- or tri-esteramine compounds, wherein the mixture of esteramine compounds is added to the mixture after the quaternization process.

The mixture of esteramine compounds added to the mixture after the quaternization step can be obtained using the same reaction conditions previously described to obtain the mixture of esteramine precursors for the mixture of quaternary ester ammonium compounds of formula (I1), (I2), (I3).

In an embodiment of the present invention, the mixture of at least one or more quaternary mono-, di- or tri-ester ammonium compounds of formula (I1), (I2), (I3) is obtained from an esteramine mixture obtained by esterification of triethanolamine and tallow or hydrogenated tallow fatty acid, wherein the degree of quaternization is from 25 to 95%.

In another embodiment of the present invention, the mixture of at least one or more quaternary mono-, di- or tri-ester ammonium compounds of formula (I1), (I2), (I3) is obtained from an esteramine mixture obtained by esterification of methyldiethanolamine and tallow or hydrogenated tallow fatty acid, wherein the degree of quaternization is from 25 to 95%.

Preparation of component (a) can be done by selection of the proper ratios of reactants or by selection of the proper amounts of ingredients according to the person skilled in the art.

Compound (b): Solvent

The present invention comprises a component (b), said component comprising at least a solvent, wherein the solvent is selected from mineral oils, paraffins and waxes derived from petroleum and animal fats and oils, and wherein the solvent content is 50% wt. or more, based on the total weight of the composition.

In another embodiment of the invention, preferred solvents are mineral oils, specially preferred are paraffin oils or mixtures of paraffin oils with macrocrystalline paraffins and microcrystalline paraffins; and vegetal and animal fats and oils such as rapeseed oil, palm oil or tallow.

Mineral Oils, Paraffins and Waxes Derived From Petroleum:

Suitable mineral oils, paraffins and waxes from petroleum according to the present invention are:

aromatic oils, which are a mixture of mineral oils from petroleum with a high content of components having aromatic type rings, white mineral oils, which are highly refined petroleum derivatives, generally used as carriers, excipients and lubricants in different industrial applications, paraffin oils, which are petroleum derivatives rich in paraffin components and have low density and a variable viscosity, macrocrystalline paraffins, which are petroleum derivatives containing mainly linear carbon chains with a molecular weight comprised between 250 and 500 and, although they are solids at room temperature, they have low melting points, usually comprised between 40° C. and 70° C., microcrystalline paraffins, which are petroleum derivatives and are mainly saturated hydrocarbons in which linear chains with short branches (isoparaffins) are predominant. They usually have mean molecular weights comprised between 500 and 800, and are solids at room temperature, having melting points comprised between 70° C. and 100° C.

Animal or Vegetable Fats and Oils

Suitable animal or vegetable fats and oils according to the present invention are esters of linear and/or branched, saturated and/or unsaturated alkanecarboxylic acids with a chain length of 1 up to 30 carbon atoms and linear and/or branched, saturated and/or unsaturated alcohols with a chain length of 1 up to 30 carbon atoms, of the group of esters of aromatic carboxylic acids and linear and/or branched, saturated and/or unsaturated alcohols with a chain length of 1 up to 30 carbon atoms. These oils can be advantageously selected from the group consisting of isopropyl myristate, isopropyl palmitate, isopropyl stearate, isopropyl oleate, n-butyl stearate, n-hexyl laurate, n-decyl oleate, isooctyl stearate, isononyl stearate, isononyl isononanoate, 2-ethylhexyl laurate, 2-ethylhexyl palmitate, 2-ethylhexyl cocoate, 2-hexyldecyl stearate, 2-ethylhexyl isostearate, 2-octyldodecyl palmitate, cetyl palmitate, oleyl oleate, oleyl erucate, erucyl oleate, erucyl erucate, as well as synthetic, semisynthetic and natural mixtures of such esters, such as jojoba oil (a natural mixture of esters of monounsaturated monocarboxylic acids with a C18-C24 chain with also monounsaturated monoalcohols and with a long C18-C24 chain). Other suitable oils of the type of esters of saturated alkanecarboxylic acids and alcohols are fatty acid methyl esters, preferably C6-C24 fatty acid methyl esters from animal and vegetable fats and oils such as cotton, safflower, coconut, rapeseed, linseed, palm, palm kernel, sunflower, olein, olive, olive pomace, castor oil, tallow, soy, tall oil, etc, possibly totally or partially hydrogenated, as well as purified or synthetic fatty acids such as caproic acid, caprylic acid, capric acid, lauric acid, myristic acid, palmitic acid, palmitoleic acid, stearic acid, isostearic acid, 2-ethylhexanoic acid, oleic acid, ricinoleic acid, elaidic acid, petroselinic acid, linoleic acid, linolenic acid, arachidic acid, gadoleic acid, behenic acid and erucic acid, or mixtures thereof.

Other suitable animal or vegetable fats and oils according to the present invention are fatty acid triglycerides, specifically triglycerin esters of linear and/or branched, saturated and/or unsaturated alkanecarboxylic acids with a chain length of 6 up to 24 carbon atoms, preferably of 10 up to 18 carbon atoms. The fatty acids esterifying the different positions of glycerin can be different, giving rise to a large amount of possible combinations, including positional combinations. The position of the different fatty acids in natural triglycerides is not random, but rather it depends on the origin of the fat. The triglycerides more simple are those constituted by a sole fatty acid.

Fatty acid triglycerides can be selected, for example, from the group consisting of synthetic, semi-synthetic and natural oils, as for example, animal fats and oils such as cow tallow, pig lard, bone oil, aquatic animal fats and oils (fish, such as herring, cod or sardine; cetaceans; etc.); and vegetable fats and oils such as avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter and the like.

From the environmental point of view, animal and vegetable fats and oils are preferred as solvent, since the use of petroleum derivatives is thus avoided. Although for the person skilled in the art it is evident that, alternatively, animal and vegetable fats and oils can also be combined with mineral oils, paraffins and waxes from petroleum, such that the resulting solvent has suitable properties from the environmental point of view (biodegradability, ecotoxicity, etc.)

The composition according to the present invention may contain further components.

In a preferred embodiment of the invention, the composition comprises:
(a) a mixture of at least one or more quaternary mono-, di- or tri-ester ammonium compounds of formula (I1), (I2), (I3) wherein in said component (a) the sum weight percentage of quaternary di- and tri-ester ammonium compound ((I2) and (I3)) is from 70 to 100% wt based on the total weight of quaternized species comprised in component (a), preferably from 80 to 100% wt and more preferably from 85 to 100% wt; and wherein the component (a) further comprises at least a mixture of one or more mono-, di- or triesteramine of formula (II1), (II2), (II3).
(b) at least a solvent, wherein the solvent is selected from mineral oils, paraffins and waxes derived from petroleum and vegetal and animal fats and oils wherein the solvent content is 50% wt. or more, based on the total weight of the composition;

Preferably, the above defined compositions are intended for preventing the caking of solid fertilizers.

Anticaking Compositions of the Invention

As indicated above, the composition of the present invention comprises
a component (a) comprising a mixture of at least one or more quaternary mono-, di- or tri-ester ammonium compounds of formula (I1), (I2), (I3); wherein in said component the sum weight percentage of quaternary di- and tri-ester ammonium compound ((I2) and (I3)) is from 70 to 100% wt based on the total weight of quaternized species comprised in component (a), preferably from 80 to 100% wt based on the total weight of the component (a);
a component (b) comprising at least a solvent, wherein the solvent is selected from mineral oils, paraffins and waxes derived from petroleum and vegetal and animal fats and oils, wherein the solvent content is 50% wt or more, based on the total weight of the composition.

In an embodiment of the present invention, the component (a) further comprises a mixture of at least one or more mono-, di- or tri-enteramine compound of formula (II1), (II2), (II3) which resulted from the partial quaternization process to obtain the mixture of quaternary mono-, di- or tri-ammonium compound of formula (I1), (I2), (I3).

In another embodiment of the present invention, the component (a) further comprises a mixture of at least one or more mono-, di- or tri-esteramine of formula (II1), (II2), (II3), which were added to the mixture after the quaternization process performed to obtain the mixture of mono-, di- or tri-esteramine of formula (I1), (I2), (I3).

In another embodiment of the invention, the composition comprises
a component (a) comprising at least a mixture of at least one or more quaternary mono-, di- or tri-ester ammonium compounds of formula (I1), (I2), (I3); wherein in said component the sum weight percentage of quaternary di- and tri-ester ammonium compound ((I2) and (I3)) is from 70 to 100% wt based on total weight of quaternized species comprised in component (a), preferably from 80 to 100% wt based on the total weight of component (a);
a component (b)comprising at least a solvent, wherein the solvent is selected from mineral oils, paraffins and waxes derived from petroleum and vegetal fats and oils, wherein the solvent content is 50% wt or more, based on the total weight of the composition; wherein the amount of water of the composition is 1% wt or less, preferably 0.5% wt or less.

In another embodiment of the invention, the composition comprises
a component (a) comprising at least a mixture of at least one or more quaternary mono-, di- or tri-ester ammonium compounds of formula (I1), (I2), (I3); wherein in said component the sum weight percentage of quaternary di- and tri-ester ammonium compound ((I2) and (I3)) is from 70 to 100% wt based on total weight of quaternized species comprised in component (a), preferably from 80 to 100% wt based on the total weight of component (a); and wherein the component (a) further comprises a mixture of at least one or more mono-, di- or tri-esteramine compound of formula (II1), (II2), (II3)

a component (b) comprising at least a solvent, wherein the solvent is selected from mineral oils, paraffins and waxes derived from petroleum and vegetal and animal fats and oils, wherein the solvent content is 50% wt or more, based on the total weight of the composition;

wherein the amount of water of the composition is 1% wt or less, preferably 0.5% wt or less.

In a preferred embodiment, the composition of the present invention consists of a component (a) comprising at least a mixture of quaternary mono-, di- or tri-ester ammonium compound of formula (I1), (I2), (I3); wherein in said component (a) the sum weight percentage of quaternary di- and tri-ester ammonium compound ((I2) and (I3)) is from 70 to 100% wt based on the total weight of quaternized species comprised in component (a), preferably from 80 to 100% wt based on the total weight of component (a) and more preferably from 85 to 100% wt;

a component (b) comprising at least a solvent, wherein the solvent is selected from mineral oils, paraffins and waxes derived from petroleum and vegetal and animal fats and oils, and wherein the solvent content is 50% wt. or more, based on the total weight of the composition.

In another preferred embodiment, the composition of the present invention consists of a component (a) comprising at least a mixture of quaternary mono-, di- or tri-ester ammonium compound of formula (I1), (I2), (I3);

wherein in said component (a) the sum weight percentage of quaternary di- and tri-ester ammonium compound ((I2) and (I3)) is from 70 to 100% wt based on the total weight of quaternized species comprised in component (a), preferably from 80 to 100% wt based on the total weight of component (a) and more preferably from 85 to 100% wt; and wherein the component (a) further comprises a mixture of at least one or more mono-, di- or tri-esteramine compound of formula (II1), (II2), (II3)

a component (b) comprising at least a solvent, wherein the solvent is selected from mineral oils, paraffins and waxes derived from petroleum and vegetal and animal fats and oils, and wherein the solvent content is 50% wt. or more, based on the total weight of the composition In a particularly preferred embodiment, component (a) comprises a mixture of at least one quaternary mono-ester ammonium compound of formula (I1), at least one quaternary di-ester ammonium compound of formula (I2), and at least one quaternary tri-ester ammonium compound of formula (I3), wherein m=n=p=2; $R_1$—C(O)— is a linear acyl group wherein $R_1$ is a linear alkyl or alkenyl containing from 11 to 21 carbon atoms, preferably derived from (hydrogenated or non-hydrogenated) tallow fatty acid; $R_2$ and $R_3$ each represent —OH, q is 0 (i.e. the compound is not alkoxyated); $X_1$, is a methyl group; and $A^-$ is selected from a halide, phosphate or alkylsulphate, preferably alkylsulphate. Such a compound may be produced by esterifying tallow fatty acid and triethanolamine, wherein the ratio of tallow fatty acid to amine is 0.83 mol of tallow fatty acid per 1 mol of hydroxyl group of the triethanolamine and subsequently methylating the esteramine obtained thereby, wherein the degree of quaternization is from 25 to 95%. This mixture is preferably combined with a solvent selected from vegetal and animal fats and oils, can also be combined with mineral oils, paraffins and waxes derived from petroleum.

The compositions according to the invention for preventing caking and crust formation in solid fertilizers preferably comprise the individual components in the following amounts, expressed as percentage by weight, with respect to the total weight of the composition:

5% to 35% of a mixture of at least one or more quaternary mono-, di- or tri-ester ammonium compounds of component (a)

50% to 95% of component (b)

Preferably, the mixture of at least one or more quaternary mono-, di- or tri-ester ammonium compounds of component (a) is contained in an amount, expressed as percentage by weight, of 10% to 30%, more preferably of 15% to 25%.

Preferably, the component (b) is contained in an amount, expressed as percentage by weight, of 55% to 90%, more preferably of 65% to 85%.

In a preferred embodiment of the invention component (b) comprises mineral oils, paraffins, waxes from petroleum, or mixtures thereof.

In another preferred embodiment of the invention, the composition comprises component (b) comprising animal and vegetable fats and oils.

In a preferred embodiment of the invention, the composition comprises, in the indicated amounts expressed as percentage by weight with respect to the total weight of the composition:

5% to 35% of a mixture of at least one or more quaternary mono-, di- or tri-ester ammonium compounds of component (a), and up to 25% of a mixture of at least one or more mono-, di- or tri-esteramine compound of formula (II1), (II2), (II3) of component (a);

50% to 95% of component b)

Preferably, the mixture of at least one or more quaternary mono-, di- or tri-ester ammonium compounds of component (a) is contained in an amount, expressed as percentage by weight, of 10% to 30%, more preferably of 15% to 25%.

Preferably, the mixture of at least one or more mono-, di- or tri-esteramine compound of formula (II1), (II2), (II3) is contained in an amount, expressed as percentage by weight, of up to 15%, more preferably of up to 10%.

Preferably, the component (b) is contained in an amount, expressed as percentage by weight, of 55% to 90%, more preferably of 65% to 85%.

In another embodiment of the invention, the composition comprises, in the indicated amounts expressed as percentage by weight with respect to the total weight of the composition:

5% to 35% of a mixture of at least one or more quaternary mono-, di- or tri-ester ammonium compounds of component (a), and up to 25% of a mixture of at least one or more mono-, di- or tri-esteramine compound of formula (II1), (II2), (II3) of component (a)

50% to 95% of component b) wherein the amount of water in the composition is 1% wt or less, preferably 0.5% wt or less.

In another preferred embodiment of the invention, in the composition of the invention comprising components (a) and (b), component (b) comprises mineral oils, paraffins and/or waxes from petroleum. In another embodiment of the invention, preferred composition is that comprising component (b) that comprises animal and vegetable fats and oils.

The compositions of the present invention can be obtained with a conventional process for mixing the different components, well known by the skilled person. For example, the different components can be mixed in molten state and once the mixture has been homogenised, it is packaged and possibly cooled.

The compositions object of the present invention have, in relation to solid fertilizers, a broad field of applications, since they are effective both for granular simple and granular complex fertilizers. They are suitable for granular simple and granular complex fertilizers of the N, NP, NK and NPK type, being especially preferable for granular complex fertilizers of the NPK and AN type.

The use of compositions object of this invention in solid fertilizers provides said fertilizers with an efficient resistance against caking, making the fertilizers to show excellent properties regarding their breakdown, even after their transport and storage period. Said use also forms part of the invention.

Another object of the invention is the process for applying the anticaking compositions. These processes are well known by the skilled person and consist, for example, but not limited to, in applying the compositions according to the invention, in molten state, by means of spraying technique, on the surface of the solid fertilizer, once such fertilizer has been manufactured.

The amount of additive to be applied on the surface of the fertilizer will depend in each case on the humidity, storage time and temperature conditions expected for the storage of the fertilizer, although good results can be obtained when said compositions are applied on the fertilizer in proportions comprised between 500 and 5000 ppm with respect to the weight of the fertilizer, preferably between 700 and 3000 pm.

Fertilizer compositions, wherein solid fertilizers are coated by applying on the surface a composition according to the invention are also a part of the invention. A composition according to the invention can be applied to both types of fertilizers, granular simple fertilizers and granular complex fertilizers, being especially preferable for granular complex fertilizers of the NPK type and for ammonium nitrate type.

The following examples are given in order to provide a person skilled in the art with a sufficiently clear and complete explanation of the present invention, but should not be considered as limiting of the essential aspects of its subject, as set out in the preceding portions of this description.

EXAMPLES

The first part of the Examples section refers to the preparation of the compositions of the present invention.

The second part of the Examples section refers to the performance of anticaking property of the compositions of the present invention.

Example 1

Preparation of the Component a (a1 to a5)
Preparation of Component 1
453.6 g of tallow acid were introduced in an inert atmosphere into a reactor, and 124.6 g of triethanolamine were added with stirring. The mixture was heated for at least 4 hours at 160-180° C. in order to remove the water of the reaction. The progress of the reaction was monitored by an acid value assay which determines the residual acidity to obtain an esterification of at least 90 to 95% of the fatty acids.

548.0 g of product were obtained, and 99.9 g of dimethyl sulphate were added to the mixture with stirring at a temperature of 40-90° C. After three hours of digestion, 648.0 g of product were obtained.

The composition of the product is determined with 1H Nuclear Magnetic Resonance (1H-NMR) at 500 MHz, using pyridine as solvent and TMS as reference. The percentages, by weight, of the di- and triesterquats measured on samples are normalized on the basis of 100%.

The sum weight percentage of quaternary di-ester and tri-ester ammonium compound is 87.6%.

Preparation of Components a2 to a5
All other components (a2 to a5) used to prepare the anticaking compositions in Table 1 were prepared analogously to a1. If the quaternization process requires a solvent to improve its workability, the esterified product is diluted in the same solvent as used as compound (b) of the anticaking composition to the extent necessary to enable the reaction.

Table 1 summarizes the sum weight percentages and the ratio of mol of fatty acid per mol of hydroxyl group of the alkanolamine of all the prepared quaternary ammonium compounds a1 to a5:

TABLE 1

| Component (a) | Fatty acid | Alkanolamine | % Sum weight di-EQ + tri-EQ | Ratio mol COOH:mol OH of alkanolamine |
|---|---|---|---|---|
| a1 | Tallow | Triethanolamine | 87.6 | 0.66:1 |
| a2 | Tallow | Triethanolamine | 97.2 | 0.83:1 |
| a3 | Hydrogenated tallow | Triethanolamine | 88.7 | 0.66:1 |
| a4 | Hydrogenated tallow | Triethanolamine | 97.5 | 0.83:1 |
| a5 | Tallow | Methyldiethanolamine | 99.4 | 1:1 |

Examples 2 to 9

Preparation of Anticaking Compositions A, B, C, D, E, F, G, H

Compositions A, B, C, D, E, F, G and H according to the present invention are detailed in Table 2. The amounts of the indicated components are expressed as parts by weight of each component added to each composition, and were prepared according to the following general method:

The solvent is loaded in a vessel provided with stirring, at the temperature necessary for achieving a good flowability in the end product, maximum 90° C. The stirring is maintained and the corresponding component a (a1, a2, a3, a4, a5) is added, maintaining the same temperature. The mixture is left under stirring for 30 minutes at the same temperature. Unloading and packaging are subsequently performed.

TABLE 2

| | Anti-caking compositions | | | | | | | |
|---|---|---|---|---|---|---|---|---|
| Components | A | B | C | D | E | F | G | H |
| a1 | 20.0 | — | — | — | 20.0 | — | — | — |
| a2 | — | 20.0 | — | 20.0 | — | — | — | — |
| a3 | — | — | — | — | — | 20.0 | — | 20.0 |
| a4 | — | — | — | — | — | — | 20.0 | — |
| a5 | — | — | 20.0 | — | — | — | — | — |
| Refined palm oil (LIPSA) | 80.0 | 80.0 | — | — | — | 80.0 | 80.0 | — |
| Paraffin process oil SN-100 | — | — | — | 80.0 | 80.0 | — | — | 80.0 |
| Crude Rapeseed Oil (Gustav Heess) | — | — | 80.0 | — | — | — | — | — |

Example 10

Anticaking Activity Evaluation Method: Accelerated Caking Test

A portion of fertilizer based on urea ((18.5.7) NPK complex granular), was treated with compositions E and H described in Table 2, (prilled type) by means of spraying said molten compositions on the fertilizer, in a rotary mixer, at a dose of 1000 ppm with respect to the weight of the fertilizer (1 Kg/MT).

Respective representative samples of fertilizer treated with the anti-caking compositions according to the invention, and of untreated fertilizer, were subjected to an accelerated caking test. The test consisted of the following steps: First, 90 g of fertilizer were introduced in a cylindrical perforated metal test tubes with a height of 60 mm and a diameter of 45 mm, which can be longitudinally opened for extracting the samples, 2 test tubes being used for each sample of fertilizer. Once the samples had been introduced in the tubes, they were subjected to a pressure of 1.26 Kg/cm$^2$ in an INSTRON dynamometer, model 1011. The test tubes were maintained, at the previously indicated pressure, at a relative humidity (R.H.) of 80% and at a temperature of 20° C. for a period of 7 hours in a HERAEUS climatic chamber, model HC 2057. The climatic conditions were subsequently changed, passing to a R.H. of 20% and 40° C. for a period of 3 days.

Finally, the test tubes were left at environmental temperature and humidity.

The first aspect that was evaluated is the agglomeration of the fertilizer. The agglomeration average in percentage is a measure of the extension of the agglomeration experimented by the sample. The second measure is the resistance to break up. The latter is measured in the already indicated dynamometer, at a rate of 10 mm/minute. The obtained result is expressed as the average resistance to break-up in kg.

The results are shown in Table 3.

TABLE 3

| Results of the caking tests | | |
|---|---|---|
| Additive (Dosage: 1 kg/MT) | Average % of agglomeration before break-up | Average resistance to break-up (kg) |
| E | 100 | 3.3 |
| H | 100 | 4.1 |
| Untreated blank | 100 | 26.0 |

Example 11

Anticaking Activity Evaluation Method: Accelerated Caking Test

Other compositions according to the present invention were tested following the method described in Example 10, this time with a NPK granular fertilizer with the following composition: 13.6% of N; 4.1% of $P_2O_5$ (water soluble); 20.2% of $K_2O$ (water soluble) a dose of 2000 ppm with respect to the weight of the fertilizer (2 Kg/MT). The test tubes were maintained, at the pressure indicated in Example 10, at a relative humidity (R.H.) of 80% and at a temperature of 20° C. for a period of 15 hours in a HERAEUS climatic chamber, model HC 2057. The climatic conditions were subsequently changed, passing to a R.H. of 20% and 40° C. for a period of 3 days.

Some compositions described in Examples 1 to 9, were tested. The obtained result is expressed as the agglomeration average in percentage and if the agglomeration has been complete, also as the average resistance to break-up in kg.

The obtained results are shown in Table 4.

TABLE 4

| Results of the caking tests | | |
|---|---|---|
| Additive (Dosage: 2 kg/T) | % of agglomeration before break-up | Average resistance to break-up (Kg.) |
| A | 100.0 | 6.3 |
| B | 64.1 | 1.2 |
| C | 100.0 | 5.4 |
| D | 81.3 | 0.0 |
| F | 100.0 | 7.3 |
| G | 100.0 | 4.9 |
| Untreated blank | 100.0 | 17.3 |

From the obtained results, it is deduced, as in Example 10, that some compositions of the invention provide good results as anti-caking agents. Compositions B and D are especially preferred for this fertilizer.

Example 12

Anticaking Activity Evaluation Method: Accelerated Caking Test

Other compositions according to the present invention were tested following the method described in Example 10, this time with the granular ammonium nitrate 33.5% nitrogen from the Tertre (Belgium) factory of the former company KEMIRA GROWHOW at a dose of 2000 ppm with respect to the weight of the fertilizer (2 Kg/MT).

The test tubes were maintained, at the pressure indicated in Example 2, at a relative humidity (R.H.) of 80% and at a temperature of 20° C. for a period of 15 hours in a HERAEUS climatic chamber, model HC 2057. The climatic conditions were subsequently changed, passing to a R.H. of 20% and 40° C. for a period of 3 days.

Some compositions already described in Examples 1 to 9, were tested. The obtained result is expressed as the agglomeration average in percentage and if the agglomeration has been complete, also as the average resistance to break-up in kg.

The obtained results are shown in Table 5.

TABLE 5

Results of the caking tests

| Additive (Dosage: 2 kg/T) | % of agglomeration before break-up | Average resistance to break-up (Kg.) |
|---|---|---|
| F | 100.0 | 27.9 |
| G | 100.0 | 17.0 |
| Untreated blank | 100.0 | 220.0 |

From the obtained results, it can be seen that the compositions of the present invention can be used as anti-caking agents for solid fertilizers, providing good results in their performance.

The modifications which do not affect, alter, change or modify the essential aspects of the described compositions are included within the scope of the present invention.

The invention claimed is:

1. A composition for preventing the caking of solid fertilizers comprising
   a component (a) which comprises a mixture of at least one or more quaternary mono-, di- or tri-ester ammonium compounds of formula (I1), (I2), (I3)

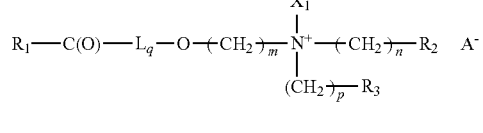
(I1)

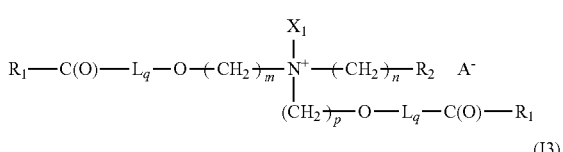
(I2)

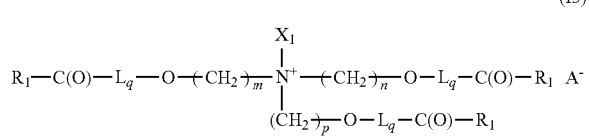
(I3)

wherein in formula I1, I2 and I3
   $R_2$ and $R_3$ each independently represent —H or —OH;
   $X_1$ represents a hydroxyalkyl group containing 1 to 4 carbon atoms, an alkyl group containing 1 to 4 carbon atoms or an alkyl group containing one aromatic group;
   $R_1$ is a linear or branched alkyl containing 5 to 23 carbon atoms or a linear alkenyl group containing 5 to 23 carbon atoms and from 1 to 3 double bonds;
   L represents a —(OCH$_2$CH$_2$)$_a$—(OCHR$_4$CH$_2$)$_b$— group, wherein $R_4$ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26;
   m, n and p each independently represent a number within the range from 1 to 4, q represents a number within the range from 0 to 26 and A$^-$ represents an anion;

wherein the sum weight percentage of di- and tri-quaternary ester ammonium compound ((I2) and (I3)) is from 70 to 100% wt, based on the total weight of quaternized species comprised in component (a)
   a component (b) which comprises at least a solvent, wherein the solvent is selected from the group consisting of mineral oils, paraffins and waxes derived from petroleum and vegetal and animal fats and oils, and wherein the solvent content is 50% wt or more, based on the total weight of the composition.

2. A composition according to claim 1, characterized in that in formula (I1) and (I2), $R_2$ and $R_3$ independently represent —OH.

3. A composition according to claim 1, characterized in that in formula (I1), (I2), (I3), m, n and p represent number 2.

4. A composition according to claim 1, characterized in that in formula (I1) and (I2), $R_2$ represents —H.

5. A composition according to claim 1, characterized in that in formula (I1), (I2), (I3), in and p represent number 2 and n represents number 1.

6. A composition according to claim 1, characterized in that in formula (I1), (I2), (I3), $R_1$ independently represents a linear or branched alkyl or a linear alkenyl group containing 11 to 21 carbon atoms.

7. A composition according to claim 1, characterized in that the component (a) further comprises a mixture of at least one or more of mono-esteramine, di-esteramine or tri-esteramine compound of formula (II1), (II2), (II3)

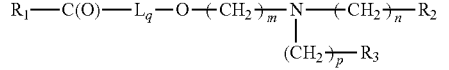
(II1)

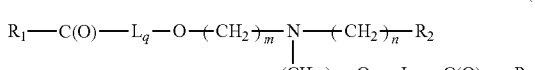
(II2)

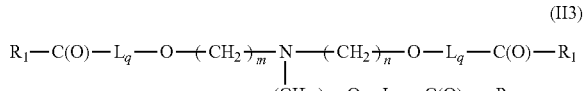
(II3)

wherein in formula II1, II2, II3
   $R_2$ and $R_3$ each independently represent —H or —OH,
   $R_1$ is a linear or branched alkyl containing 5 to 23 carbon atoms or a linear alkenyl group containing 5 to 23 carbon atoms and from 1 to 3 double bonds,
   L represents a —(OCH$_2$CH$_2$)$_a$—(OCHR$_4$CH$_2$)$_b$— group, wherein $R_4$ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26,
   m, n, p each independently represent a number within the range from 1 to 4, and q represents a number with the range from 0 to 26.

8. A composition according to claim 1 characterized in that the components are comprised in the following amounts, expressed as percentage by weight with respect to the total weight of the composition:
   5% to 35% of a mixture of at least, one or more quaternary mono-, di- or tri-ester ammonium compounds of formula (I1), (I2), (I3) of component (a), and
   50% to 95% of component (b).

9. A composition according to claim 7, wherein the composition comprises the mixture of at least one, or more quaternary mono-, di- or tri-ester ammonium compounds of formula (I1), (I2), (I3) of component (a), further comprises up, to 25% of at least one or more mono-, di- or tri-esteramine compound of formula (II1), (II2), (II3) as defined in claim 7, and component (b).

10. A composition according to claim 1, wherein the amount of water of the composition is 1% wt or less.

11. A method for obtaining solid fertilizers resistant to caking, characterized in that the solid fertilizer particles
   are coated; or
   are mixed with a composition comprising:
      a component (a), which comprises a mixture of at least one or more quaternary mono-, di- or tri-ester ammonium compounds of formula (I1), (I2), (I3)

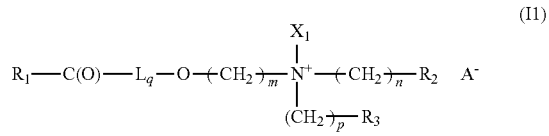

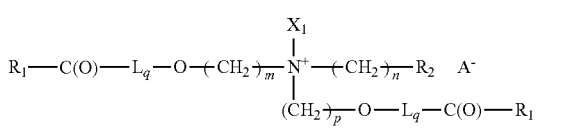

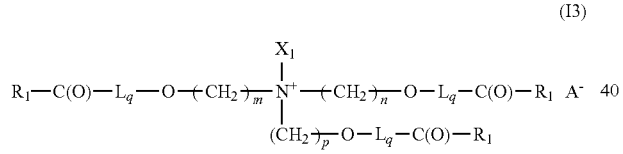

wherein in formula I1, I2 and I3
   $R_2$ and $R_3$ each independently represent —H or —OH;
   $X_1$ represents a hydroxyalkyl group containing 1 to 4 carbon atoms, an alkyl group containing 1 to 4 carbon atoms or an alkyl group containing one aromatic group;
   $R_1$ is a linear or branched alkyl containing 5 to 23 carbon atoms or a linear alkenyl group containing 5 to 23 carbon atoms and from 1 to 3 double bonds;
   L represents a —(OCH$_2$CH$_2$)$_a$—(OCHR$_4$CH$_2$)$_b$— group, wherein $R_4$ represents an alkyl group containing 1 to 4 carbon atoms, a represents a number within the range of 0 to 20, b represents a, number within the range of 0 to 6, and the sum of a+b represents the average alkoxylation degree which corresponds to a number from 0 to 26;
   m, n and p each independently represent a number within the range from 1 to 4, q represents a number within the range from 0 to 26 and A$^-$ represents an anion,
wherein the sum weight % of di- and tri-quaternary ester ammonium compound ((I2) and (I3)) is from 70 to 100% wt, based on the total weight of quaternized species comprised in component (a);

a component (b) which comprises at least a solvent, wherein the solvent content is 50% wt or more, based on the total weight of the composition.

12. The method of claim 11 characterized in that the components are comprised in the following amounts, expressed as percentage by weight with respect to the total weight of the composition:
   5% to 35% of a mixture of at least one or more quaternary mono-, di- or tri-ester ammonium compounds of formula (I1), (I2), (I3) of component (a)
   50% to 95% of component (b).

13. The method of claim 11 characterized in that the component (a) further comprises a mixture of at least one or more of mono-esteramine, di-esteramine or tri-esteramine compound of formula (II1), (II2), (II3)

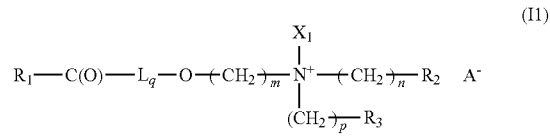

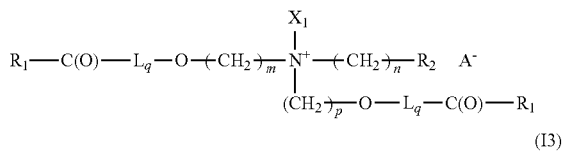

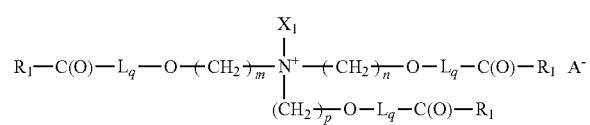

wherein in formula II1, II2, II3
   $R_2$ and $R_3$ each independently represent or —H or —OH,
   $R_1$ is a linear or branched alkyl containing 5 to 23 carbon atoms or a linear alkenyl group containing 5 to 23 carbon atoms and from 1 to 3 double bonds,
   L represents a —(OCH$_2$CH$_2$)$_a$—(OCHR$_4$CH$_2$)$_b$— group, wherein $R_4$ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26,
   m, n, p each independently represent a number within the range from 1 to 4, and q represents a number with the range from 0 to 26.

14. The method of claim 13, wherein the composition comprises 5% to 35% by weight of the mono-, di- and tri-ester ammonium compounds of formula (I1), (I2) and (I3), up to 25% by weight of the mono-, di- and tri-ester amine compounds of formula (I1), (I2) and (I3), and 50% to 95% by weight of compound (b).

15. A fertilizer with reduced caking, comprising:
   (i) a solid, granular fertilizer; and
   (ii) an anticaking agent applied to the fertilizer, the anticaking agent comprising;
   a component (a) which comprises a mixture of at least one or more quaternary mono-, di- or tri-ester, ammonium compounds of formula (I1), (I2), (I3)

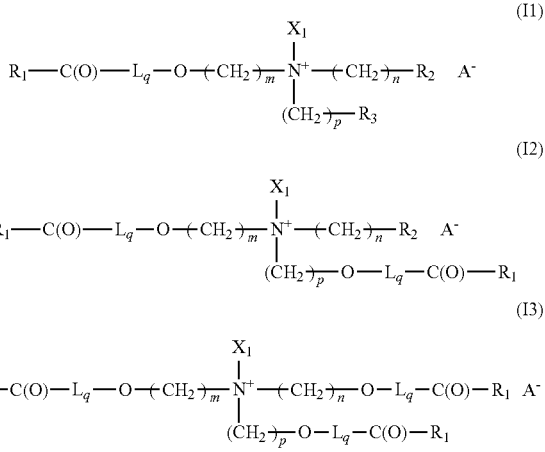

wherein in formula I1, I2 and I3
- $R_2$ and $R_3$ each independently represent —H or —OH;
- $X_1$ represents a hydroxyalkyl group containing 1 to 4 carbon atoms, an alkyl group containing 1 to 4 carbon atoms or an alkyl group containing one aromatic group;
- $R_1$ is a linear or branched alkyl containing 5 to 23 carbon atoms or a linear alkenyl group containing 5 to 23 carbon atoms and from 1 to 3 double bonds;
- L represents a $—(OCH_2CH_2)_a—(OCHR_4CH_2)_b—$ group, wherein $R_4$ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26;
- m, n and p each independently represent a number within the range from 1 to 4, q represents a number within the range from 0 to 26 and $A^-$ represents an anion;

wherein the sum weight percentage of di- and tri-quaternary ester ammonium compound ((I2) and (I3)) is from 70 to 100% wt, based on the total weight of quaternized species comprised in component (a)

a component (b) which comprises at least a solvent, wherein the solvent is selected from the group consisting of mineral oils, paraffins and waxes derived from petroleum and vegetal and animal fats and oils, and wherein the solvent content is 50% wt or more, based on the total weight of the composition.

16. The fertilizer of claim 15, characterized in that in formula (I1) and (I2), $R_2$ and $R_3$ independently represent —OH.

17. The fertilizer of claim 15, characterized in that in formula (I1), (I2), (I3) m, n and p represent number 2.

18. The fertilizer of claim 15, wherein the anticaking agent is coated on the surface of the granular fertilizer.

19. The fertilizer of claim 15, characterized in that the component (a) further comprises a mixture of at least one or more of mono-esteramine, di-esteramine or tri-esteramine compound of formula (II1), (II2), (II3)

$$R_1—C(O)—L_q—O—(CH_2)_m—N—(CH_2)_n—R_2 \quad (II1)$$
$$| \atop (CH_2)_p—R_3$$

$$R_1—C(O)—L_q—O—(CH_2)_m—N—(CH_2)_n—R_2 \quad (II2)$$
$$| \atop (CH_2)_p—O—L_q—C(O)—R_1$$

$$R_1—C(O)—L_q—O—(CH_2)_m—N—(CH_2)_n—O—L_q—C(O)—R_1 \quad (II3)$$
$$| \atop (CH_2)_p—O—L_q—C(O)—R_1$$

wherein in formula II1, II2, II3
- $R_2$ and $R_3$ each independently represent —H or —OH,
- $R_1$ is a linear or branched alkyl containing 5 to 23 carbon atoms or a linear alkenyl group containing 5 to 23 carbon atoms and from 1 to 3 double bonds,
- L represents a $—(OCH_2CH_2)_a—(OCHR_4CH_2)_b—$ group, wherein $R_4$ represents an alkyl group containing 1 to 4 carbon atoms, a represents a number within the range of 0 to 20, b represents a number within the range of 0 to 6, and the sum of a+b represents the average alkoxylation degree which corresponds to a number from 0 to 26,
- m, n, p each independently represent a number within the range from 1 to 4, and q represents a number with the range from 0 to 26.

20. The fertilizer of claim 15, wherein the anticaking agent comprises 5% to 35% by weight of the mono-, di- and tri-ester ammonium compounds of formula (I1), (I2) and (I3), up to 25% by weight of the mono-, di- and tri-ester amine compounds of formula (I1), (I2) and (I3), and 50% to 95% by weight of compound (b).

* * * * *